United States Patent [19]
Wong

[11] Patent Number: 5,137,383
[45] Date of Patent: Aug. 11, 1992

[54] CHINESE AND ROMAN ALPHABET KEYBOARD ARRANGEMENT

[76] Inventor: Kam-Fu Wong, 22nd Floor, Wu Sang House, 655 Nathan Road, Kowloon, Hong Kong

[21] Appl. No.: 622,190

[22] Filed: Dec. 5, 1990

Related U.S. Application Data

[60] Continuation of Ser. No. 253,910, Oct. 6, 1988, abandoned, which is a division of Ser. No. 813,543, Dec. 26, 1985, abandoned.

[51] Int. Cl.$^5$ ................................ B41J 5/00
[52] U.S. Cl. ................................ 400/484; 364/41.9
[58] Field of Search ............... 400/109, 110, 484; 364/419

[56] References Cited

U.S. PATENT DOCUMENTS

| | | | |
|---|---|---|---|
| 3,513,968 | 5/1970 | Hanson | 400/111 X |
| 3,938,099 | 2/1976 | Hyder | 400/111 X |
| 3,950,734 | 4/1976 | Li | 400/110 X |
| 3,995,389 | 12/1976 | Mathis | 283/42 X |
| 3,998,310 | 12/1976 | Chaudhry | 400/111 |
| 4,084,680 | 4/1978 | Deetz | 400/63 |
| 4,159,471 | 6/1979 | Whitaker | 400/109 X |
| 4,176,974 | 12/1979 | Bishai et al. | 400/63 X |
| 4,187,031 | 2/1980 | Yeh | 400/121 X |
| 4,220,417 | 9/1980 | Sprott et al. | 400/70 |
| 4,357,115 | 11/1982 | Or | 400/110 |
| 4,375,922 | 3/1983 | Maegawa et al. | 400/70 |
| 4,462,703 | 7/1984 | Lee | 400/110 |
| 4,505,602 | 3/1985 | Wong | 400/10 |
| 4,531,119 | 7/1985 | Nakayama et al. | 400/110 X |
| 4,543,631 | 9/1985 | Kurosu et al. | 400/110 X |
| 4,559,615 | 12/1985 | Goo et al. | 400/110 X |
| 4,580,916 | 4/1986 | Rolfo et al. | 400/109 |
| 4,649,231 | 3/1987 | Marbet | 400/70 X |

FOREIGN PATENT DOCUMENTS

| | | | |
|---|---|---|---|
| 0118174 | 9/1981 | Japan | 400/83 |
| 2071018 | 9/1981 | United Kingdom | 400/110 |
| 2100899A | 5/1982 | United Kingdom | 400/109 |
| 2113613 | 8/1983 | United Kingdom | 400/109 |
| 2116341 | 9/1983 | United Kingdom | 400/110 |
| 2118749 | 11/1983 | United Kingdom | 400/110 |
| 2120977 | 12/1983 | United Kingdom | 400/110 |
| 2125197 | 2/1984 | United Kingdom | 400/110 |
| 2158776 | 11/1985 | United Kingdom | 400/110 |

OTHER PUBLICATIONS

Xerox 800 Electronic Typing System Operator Manual, Magnetic Card, Published Oct. 7, 1974 by Xerox, pp. 7, 8, 11, 87, 88, 89, 90.

*Primary Examiner*—David A. Wiecking
*Assistant Examiner*—Steven S. Kelley
*Attorney, Agent, or Firm*—Banner, Birch, McKie & Beckett

[57] ABSTRACT

An apparatus and method for encoding Chinese characters into a computer. Each character is divided into a leading part and a body part. The leading part is represented by one code element and the body part is represented by four code elements. The code elements are input to the computer using a keyboard, with the code element for the leading part being input first followed by the code elements for the body part.

5 Claims, 6 Drawing Sheets

FIG. 1

| STROKE | ㇒ 八 | 乚 丶 | l ᠘ | 冂 口 | ′ ) | 丶 \ | — / | ㇈ ㇆ | 十 ㇗ | 亠 ㇹ |
|---|---|---|---|---|---|---|---|---|---|---|
| CORRESPONDING DIGIT | 1 | 2 | 3 | 4 | 5 | 6 | 7 | 8 | 9 | 0 |
| KEY IN THE KEYBOARD | A | S | D | F | G | H | J | K | L | ; |

| LEADING PART, PAGE | LEADING PART, PAGE | LEADING PART, PAGE | LEADING PART, PAGE | LEADING PART, PAGE |
|---|---|---|---|---|
| 人八 1- | 亻山 11- | 扌彳 21- | 鱼角 31- | 矢田舌 41- |
| 乙乀 2- | 广日 12- | 石尸 22- | 革身 32- | 西学糸 42- |
| 丨丨 3- | 丨走 13- | 王门 23- | 酉勹 33- | 敞羽非 43- |
| 口冂 4- | 扌贝 14- | 纟目 24- | 彐豸歹 34- | 戍犭至 44- |
| 丿 5- | 氵卩 15- | 禾足 25- | 夕夂 35- | 幸虫亦 45- |
| 丶丶 6- | 艹牛 16- | 辶雨 26- | 虍气户 36- | |
| - - 7- | 氵冫 17- | 钅弓 27- | 关夫芊 37- | |
| 一丁 8- | 木立 18- | 月米 28- | 方白巾 38- | |
| 十寸 9- | 宀土 19- | 忄马 29- | 主止工 39- | |
| 亠丷 0- | 竹火 20- | 女车 30- | 耳舟其 40- | |

| 案2759 | 安275 | 宅5866 | 穿1732 | 窗1545 | 定7357 | 富1007 | 输入键 |
|---|---|---|---|---|---|---|---|
| 埃2657 | 坝275 | 察5373 | 城2675 | 堤4773 | 地328 | 堆9574 | 一上* |

FIG. 5(B)

| 宾373 | 察866 | 庞672 | 客864 | 蛋562 | 宿375 | 宛868 | 宅27 | 冗72 | 输入码 |
|---|---|---|---|---|---|---|---|---|---|
| 埠837 | 赤31 | 堆309 | 场8855 | 垢574 | 郝318 | 均867 | 歧81 | 志266 | *-5 |

FIG. 5(C)

| 察66 | 客64 | 宛68 | | | | 输入码 |
|---|---|---|---|---|---|---|
| 埠37 | 均67 | 歧1 | 均7 | | | *-58 |

FIG. 5(D)

| 察6 | 客4 | 宛8 | | | | 输入码 |
|---|---|---|---|---|---|---|
| 均7 | | | | | | *-586 |

FIG. 5(E)

| 客 | 输入码 |
|---|---|
| | ★ -5864 |

FIG. 5(F)

| 发 a | 伐 a | 云 a | 法 a | 反 an | 返 an | 翻 an | 拼音输入码 |
|---|---|---|---|---|---|---|---|
| 非 EI | 肥 ei | 翡 ei | 废 ei | 丰 eng | 锋 eng | 封 eng | 冯 eng | f- |
| 费 n | 芬 n | 酚 n | 吩 n | 氛 n | | | |

FIG. 5(G)

| 非 i | 飞 i | 肥 i | 匪 i | 诽 i | 吠 i | 肺 i | 废 i | 拼音输入码 |
|---|---|---|---|---|---|---|---|---|
| 费 n | 芬 n | 酚 n | 吩 n | 氛 n | 纷 n | 扮 n | 焚 n | 汾 n | f-e |

FIG. 5(H)

| · | - | ⌢ | ⌵ | ˋ | ˋ | ˋ | ˋ | 声调 拼音 输入码 |
|---|---|---|---|---|---|---|---|---|
| · | 非 | 飞 | 肥 | 匪 | 诽 | 吠 | 肺 | 废 | 请选择 f-ei |
| · | 非 | | | | | | | | |

FIG. 6

| | | |
|---|---|---|
| 氵人 | 17-1 | 浴沦泱淡洚泠涼浃滝治清渝达浚潽泾溱溎淘沧汾洽 |
| 氵乙 | 17-2 | 滔潍池涵波渗治浅汝洞浇洄柒涌漂 |
| 氵丨 | 17-3 | 滴清沙浆挲油涔尚池涪煮涉滗浊溃溲沽涢淖滏淘澄淘滤沪湻波婆 |
| 氵口 | 17-4 | 泗濩泂涡洇深滹浑潞泥涸澡滇涓洒沉汨汩潒混湜洞漫沮渴涸沮涉㴔沮泥淯 湎渭淠遇 |
| 氵丿 | 17-5 | 沃渣渌泺泖沁溜溇淮濮渊浜沈泊散洎湟渼潯湸泌派沂泙清滞浮溪活淫溪洮 泛汮沿海没染池浦氿汽汽涛沟浃浼洵渔滀淘潏汐洛泽溁滃泡潘渊涨蒲活沸 |
| 氵、 | 17-6 | 涧润濁泞溶沱痰疗淀道浇涤演滔滓浪沪涟泳 |
| 氵一 | 17-7 | 汇沤汛渠汀沔澟潭遷澡洱浸河清潸江鸿浯洹酒洒洹源沥浔系测漣沅开汪 |
| 氵门 | 17-8 | 犯沢涤淚涠沼涩梁泥別漏涅潞汲汉涌灌汉湮泾灌泽溂渌浸浔㴛涩潺汤 |
| 氵十 | 17-9 | 计溃汴沫泳涩浚湘造渐洲泼清淳滞泾涤瑁灌洿遣溟港滿洪道沿溟滿湛溝 沽油洣游㴩湖滇溚漖洐涤洁洁洗沫清蓴沫法洁洁彰濗浙泮清荒注浃津 |
| 氵二 | 17-0 | 涝髙泣洁漳澶沣涞滠高渖汻濊浇湼溧湾萡汴遘添亭芦澹夜汶河済汽㴱㴰㴰 渡浩㴨㴺渐湖泮湶溓注 |

CHINESE AND ROMAN ALPHABET KEYBOARD ARRANGEMENT

This application is a continuation of Ser. No. 07/253,910 filed Oct. 6, 1988, now abandoned, which is a division of Ser. No. 06/813,543 filed Dec. 26, 1985, now abandoned.

BACKGROUND OF THE INVENTION

The invention relates to a system for encoding Chinese characters by means of which Chinese characters can be fed into an electronic computer, telex or teleprinter machine or the like, and the system can also be used to index a Chinese directory.

Up to now, there are more than 400 methods for encoding Chinese characters including the method of encoding Chinese characters in numerical notation described and claimed in United Kingdom Patent No. 2 100 899, but only a few are workable. Generally speaking, there are five categories of systems for encoding and inputting Chinese characters.

1. Phonetically Alphabetic system

This kind of system is only applicable to professional computer operators who have a good command of Chinese alphabetic spelling. Only when the alphabetic spelling is 100 percent correct, can the character be identified. Since there are many homonyms in Chinese characters, it is too hard or even impossible for a person who does not know Chinese alphabetic spelling or only has scant knowledge thereof.

2. Large keyboard system

Under this system, the whole character is fed into a computer by only one key. Only those characters which are on the keyboard can be fed into the computer. It needs a very large keyboard which occupies a large space. Furthermore, it takes a long time to get familiar with the keyboard. It is very difficult for an operator to type or feed into a computer without looking at the keyboard.

3. Parts system

Under this system, the Chinese character is divided into several parts. One part is given a code (or digit) that can be fed into a computer. The advantage of this system is that the Chinese character can be easily divided and quickly fed into a computer, for example , . Such feeding depends on 100 per cent correct division of the character, otherwise the character can not be identified. Some characters, for example " , , ", are almost impossible to divide into parts, particularly for those who are not familiar with Chinese characters. Another drawback is that there is no strict rule for such division and the division of a character varies from person to person, therefore it is not easy to correctly divide a character.

4. Number code system

This is a better system which is relatively easy to learn. But it usually involves a long code and some characters may have the same codes as others. The procedure of encoding under this system is first to divide a character into several parts and then give each part a digit. Since there is no strict rule in dividing a character into parts and a stroke may be given a different digit in different characters, this system also has obvious drawbacks.

5. Word, phase and sentence system

This encoding system has numerous Chinese characters. Under this system Chinese characters forming 200,000 phrases and sentences are encoded and the whole phrase or whole sentence is fed into a computer. This system is only suitable to a computer which has good performance and large storage space.

In summary, it can be seen that each of the five systems has its own serious drawbacks. It is too difficult to divide Chinese characters into parts and then encode them. In addition, it is very inconvenient to encode a Chinese character stroke by stroke, and the code is quite long. The Chinese character consists of a leading part and a body part or strokes. Dividing them is very difficult.

SUMMARY OF THE INVENTION

It is therefore an object of the present invention to provide a simple encoding system for Chinese characters and in particular, a system whereby the character can be encoded in a form suitable for simple and quick entry into an electronic computer.

According to the present invention, each Chinese character is considered as a plain figure which can be divided into two parts, a leading part and a body part. The leading part is represented by one code element and the body part is represented by four code elements (digits). The code element for the leading part is first fed into a computer, and then the code elements for the body part are fed into a computer so that the whole Chinese character can be fed into the computer.

Since the encoding system of the present invention is not based on Phonetical Alphabet or stroke order of hand writing, it is especially suitable for those who are not familiar with Chinese characters. By means of the encoding method of the present invention anyone can feed Chinese characters into computers without difficulties whether he or she knows phonetical Alphabet and the Chinese hand writing rules for Chinese characters or not.

The keyboard of the present invention can be used for Chinese characters and letters of the Roman Alphabet. It can be used anywhere in the world. Additionally, one can use it to touch type, that is typewriting without looking at the keyboard.

BRIEF DESCRIPTION OF THE DRAWINGS

FIG. 1 shows a keyboard arrangement of the encoding system of the present invention.

FIG. 3 shows an index example of the Chinese dictionary complied according to the encoding system of this invention.

FIGS. 5(A)-5(H) illustrate the encoding of a Chinese character.

FIG. 6 illustrates a Chinese dictionay index in accordance with the present invention.

DETAILED DESCRIPTION OF THE INVENTION

Figure 1:
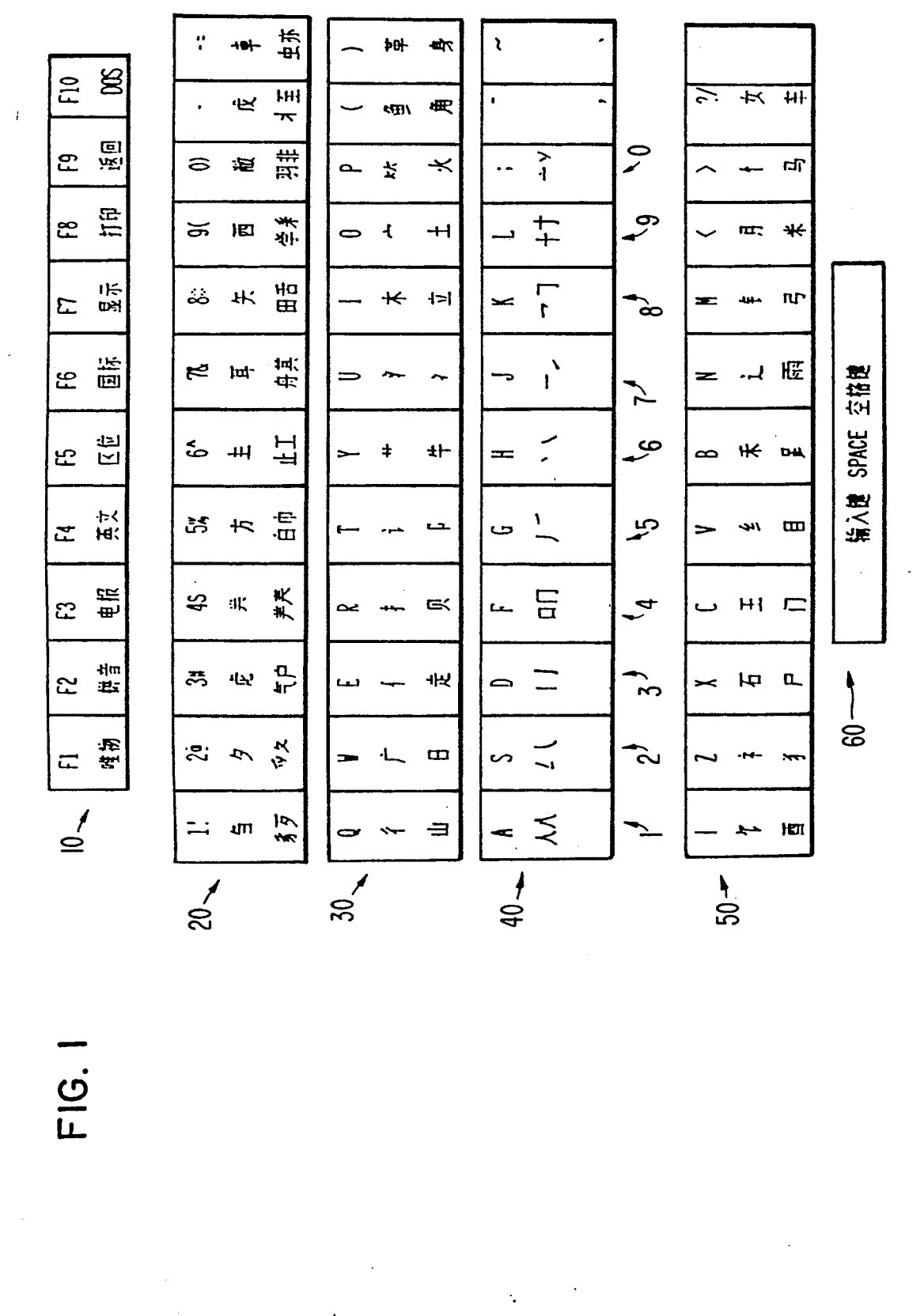
Figures 2, 4:
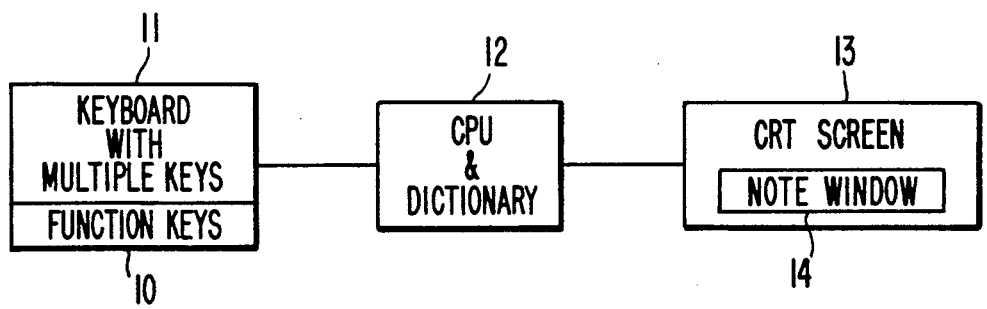
FIG. 2 shows the relation between ten basic strokes and the corresponding keys on the keyboard of the encoding system of this invention.
FIG. 4 shows a block diagram of the present invention.

According to the present invention, and with reference to FIG. 1 of the drawings, there are eighty-two leading parts which are arranged on thirty-five keys, three leading parts on each of the twelve keys in the second row 20 from the top of FIG. 1 two leading parts on each of the twelve keys in the third row 30 from the top of FIG. 1 and two leading parts on each of the first eleven keys in the fifth row 50 from the top of FIG. 1. With the help of leading-part-keys the operator can easily divide a Chinese character into a leading part and a body part and does not need to think how to divide them so as to decrease hesitation during the division of the leading part and the body part, decrease memory, decrease consideration pressure and increase encoding velocity.

For the body part there are ten stroke shapes , , , , , , , , , which are represented respectively by 1, 2, 3, 4, 5, 6, 7, 8, 9, 0 in FIG. 1 and FIG. 2 (i.e. key A, S, D, F, G, H, J, K, L;). Since for most Chinese characters it is necessary to push three or four body-part-keys, it is convenient to arrange the body-part-keys in the positions which are frequently used so that the moving frequency of the fingers can be decreased and encoding velocity can be increased.

During encoding, one divides a Chinese character into a leading part and a body part as shown in FIG. 3, finds the corresponding leading-part-key on the keyboard and presses it. The code representing the leading part is then fed into a computer. For example, if someone wants to feed the Chinese character " " into a computer, he will divide " " into " " and " ". The " " is the leading part. On the keyboard he can find the leading-part-key for the leading part " " and then press it. The leading part " " is now fed into the computer. The lower part and the right part of a character, however, can not be called the leading part. Therefore, these parts cannot be fed in by leading-part-keys. By way of example, the character " " has a part " " on the right. Although the " " part has a key on the keyboard representing the same as a leading part, the " " part of the character can not be input by that key. The character " " thus can only be treated as a connected character. Another example is " ". The " " part can not be input by the same leading part key. This character " " can only be inputted as a connected character.

After the leading part is fed into the computer, the body part of the character can be encoded. The number of strokes extracted from the body part for encoding is, at most, four. The basic rule for taking strokes is upper level first, lower second. For example, the character " ", has a leading part " " and the first four strokes of the body part are " ", " ", " " and " " corresponding to code element digits 7, 3, 3 and 7, so the code of the character " " is 7337. For another example, the Chinese character " " can be divided into the leading part " " and the body part " ". The strokes of this body part are " " and " " corresponding to digits 7 and 3, so the code for " " is 73.

But there are some Chinese characters whose body part can be divided into a left part and a right part. For those characters there is another rule for taking strokes, left first, right second. By way of example, the body part " " of the character " " can be divided into " " and " ". In encoding it, one first takes the strokes of the left part " " and then the strokes of the right part " " following the rule upper first, lower second.

For characters which can be divided into an outside part and an inside part the rule for taking strokes is outside first, inside second. Of course for the inside sub-part or outside sub-part it is still the rule upper first, lower second. For example, the character " " which has the body part " ", its outside part is " ", inside part is " ", the first four strokes of the body part are " ", " ", " " and " ".

The connected characters are those characters which have no leading parts. So the code for such characters should be taken stroke by stroke. The number of strokes taken from connected characters is, at most, five. The rule for coding connected characters is the same as the rule for the body part of characters. For example, the code for character " " is 656, the code for the character " " is 07547.

The keyboard of the present invention can be the normal Roman letter keyboard, see FIG. 1. The first row of keys from the top serve as function-keys by means of which the feeding mode can be selected. For example, F1 represents the feeding mode of the encoding system according to the present invention. F2 represents the feeding mode of the Phonetically Alphabetic system. Examples of assignments for the other function keys are set forth below.

F3—telegram
F4—type in English
F5—regional code
F6—international code
F7—display
F8—print
F9—return
F10—interchange PC system (English) with SP system (Chinese)

With respect to function keys F5 and F6, in the fundamental library of Chinese characters, each character carries two fixed codes, a regional and international code. Thus, function keys F5 and F6 set these codes accordingly.

The second, third and fifth rows 20, 30, 50 from the top of FIG. 1 the keyboard serve as "leading-part-keys." Eighty-two (82) basic leading parts are arranged on 35 keys. Though each leading-part-key shows three leading parts, the correct one is automatically selected by the computer when the body part of the character is entered.

In the fourth row 40, the first ten keys from the left serve as "body-part-keys" each of which corresponds to two similar strokes, see FIG. 2. The computer 12 also selects the correct body-part from among the two on each body-part-key.

The lowest bar-key 60 on the keyboard of FIG. 1 serves as the feeding key which is used after encoding. Of course the bar-key 60 is also the space key.

FIG. 4 shows the layout of the system. The keyboard 11 is a typical "QWERTY" (also called ASCII type) keyboard used in computers and English language typewriters with a set of function keys 10 used to select between English and Chinese. The function keys may be used to select other features as described herein. The keyboard 11 is connected to the CPU 12 which contains the modified Chinese dictionary described herein stored in RAM, ROM, or on a magnetic disk as is well known in the computer arts. The CPU 12 is further connected to a CRT screen 13 for displaying the typed Chinese characters.

Furthermore the last two lines on the bottom of the screen 13 of the computer 12 act as a "note-window 14" which displays twenty-two Chinese characters and their codes in two lines. The computer operator can see the Chinese characters and their codes on the screen 13 so that he can learn the code by looking at the "note-window 14" and he need not look for the code of some hard-to-encode character in the code hand-book.

By way of example, it is desired to feed the character " " into a computer whose leading part is " ".

First: when the leading part-key " ", is pressed, 22 Chinese characters which have leading part " " or " " are shown on the "note-window 14", most of them having a code composed of 4 digits.

An example of the Chinese characters and associated codes is shown in FIG. 5(A).

Since the body part of " " is " " the first stroke of which is " " corresponding to the digit 5, the second step is pressing the body-part-key "5". A few of the characters, whose body part have as a first stroke " " which also have the leading part " " or " ", are shown in the "note-window 14". These characters have left, at most, 3 digits as shown in FIG. 5(B).

Since the second stroke of body part " " is " " corresponding to digit 8, the third step is to press the body part-key "8". A number of characters which have second stroke " " in its body part are shown in the "note-window 14". These characters have left, at most, 2 digits as shown in FIG. 5(C).

Since the third stroke of the body part " " is " " corresponding to digit 6, the fourth step is to press the body-part-key "6". A number of characters which have third stroke " " in its body part are shown in the "note-window 14" as shown in FIG. 5(D).

The fourth stroke of the body part " " corresponds to digit 4.

Fifth step: press the body part key "4". The character " " is the one that remains in the "note-window 14"; by pressing the bar key 60, one can feed the character " " into a computer 12 as shown in FIG. 5(E).

In the same way, the Chinese character can be fed into a computer 12 by means of a phonetically alphabetic system.

For example, feeding the character " " which has phonetical alphabetic "Fei".

First step: pressing the key F, then a number of characters which have the phonetical Alphabet F will be shown in the "note-window". The area on the far right shows the Alphabet fed into a computer 12 as shown in FIG. 5(F).

Second step: pressing the key "e". The "note-window 14" then will show many characters as shown in FIG. 5(G).

Third step: pressing the key "i". All characters which have the same phonetical Alphabet "Fei" and their symbols are shown in the "note-window 14". You can now select " " from them as shown in FIG. 5(H).

Another advantage of the present invention is that there are two or more codes for one character. This advantage is very convenient for the operator. If one character has only one code, it will be necessary to have 100% correct encoding and feeding, otherwise one cannot find the character. If there are two or more codes for one character, it will make the encoding much easier. For example, the character " " has two codes, Y0591 and YWI through which the character " " can be fed into the computer 12, so that the feeding velocity and efficiency will be improved.

This system for encoding Chinese characters can also be used for indexing a Chinese dictionary. This is a new development in indexing a Chinese character. Under this system, characters of the same code are put on the same page of the dictionary. Under this system the leading part code and body part code are used as the page number in a Chinese dictionary, which makes searching for words in such a dictionary simpler.

For example, it is desired to search the character " ". The procedures for searching the character " " are:

(1) to determine the leading part code first. From FIG. 3 you can find the code for " " is 17 which corresponds to page 17 in the dictionary.

(2) to determine the body part code. In this case the body part is " ". The first stroke of " " is " " corresponding to digit 5.

(3) So the dictionary entry for character " " can be found on page "17-5" in the second row, seventeenth character. See FIG. 6.

FIG. 4 illustrates a block diagram of a keyboard and system for encoding chinese characters of the present invention. CPU and dictionary 12 is coupled to keyboard 11 and CRT Screen 13. Keyboard 11 includes multiple keys for inputting leading and body parts of chinese characters into CPU 12. Keyboard 11 also includes function keys 10 for selecting between different modes of the system, such as feeding mode, regional code, international code, type in English, etc. CPU and dictionary 12 operate to generate a particular chinese character in response to the character's leading part, strokes and corresponding body parts. The body parts are entered using keyboard 11 and may comprise up to 4 number codes. The number codes combined with any other leading or body parts uniquely identifies the particular chinese character. CRT Screen 13 visually displays the character information to the user. Note window 14 may comprise the lower two lines of CRT Screen 13 and displays a series of possible characters and their corresponding number codes for a selected leading part.

I claim:

1. An apparatus for encoding Chinese characters into corresponding codes, each of said characters formed from a leading part and one or more body parts, each of said leading parts represents the basic leading part of a Chinese character, each of said body parts comprises one or more basic strokes of a Chinese character, said apparatus comprising:

a keyboard for manually inputting data representing said leading parts and said body parts to allow the user to uniquely select the Chinese character, said keyboard comprising:

a plurality of leading part keys, each of said leading part keys corresponding to two or more said leading parts;

a plurality of body part keys, each of said body part keys corresponding to one of said body parts; and processing means coupled to said keyboard for receiving said data from said key-board, said processing means automatically selecting one of said leading parts corresponding to said leading part key in response to said data representing said leading parts and said body parts in order to identify and encode a selected Chinese character; and visual display means coupled to said processing means and operating to display at least some of said body parts, said leading parts or said characters.

2. The apparatus according to claim 1, wherein said keyboard further comprises a plurality of function keys for selecting different input modes of said apparatus.

3. The apparatus according to claim 2, wherein said leading part keys also correspond to at least one letter of the Roman alphabet, wherein an operator of said apparatus can select said leading parts or said at least one letter by selecting a different one of said function keys.

4. An apparatus according to claim 1 wherein a Chinese character, once encoded, may be input into said processing means by pressing a space key one time.

5. An apparatus according to claim 1 wherein said keyboard is formed of 35 leading part keys, said 35 leading part keys correspond to at least eighty-two leading parts.

* * * * *